Jan. 14, 1930.  E. C. WENTE  1,743,414
METHOD AND APPARATUS FOR DETERMINING THE PROPERTIES OF ACOUSTIC MATERIALS
Filed July 13, 1926

Inventor:
Edward C. Wente
by  *Joel C. L. Palmer* Att'y.

Patented Jan. 14, 1930

1,743,414

UNITED STATES PATENT OFFICE

EDWARD C. WENTE, OF NEW YORK, N. Y., ASSIGNOR TO WESTERN ELECTRIC COMPANY, INCORPORATED, OF NEW YORK, N. Y., A CORPORATION OF NEW YORK

METHOD AND APPARATUS FOR DETERMINING THE PROPERTIES OF ACOUSTIC MATERIALS

Application filed July 13, 1926. Serial No. 122,085.

This invention relates to the testing of acoustic materials and particularly to the determination of the reflection and absorption coefficients of porous materials.

An object of this invention is to provide a simple and accurate method and apparatus for testing the acoustic properties of materials and particularly the reflection and absorption coefficients of porous materials.

In accordance with this invention the properties of acoustic materials are determined by measuring the input impedance of an air column, one end of which is terminated by the material under test and on the other end of which sound waves are impressed. In particular, the amplitude coefficient of reflection is determined from the ratio of the maximum to minimum pressure at the input end for varying lengths of the column.

The invention is embodied in a tube having walls practically impervious to sound, a tight-fitting plunger having a solid end, and arranged to mount the material under test for closing one end of the tube, an electromagnetic receiver for impressing waves on the other end, and an instrument for measuring the pressure within the tube at the face of the diaphragm of the receiver.

Figure 1:
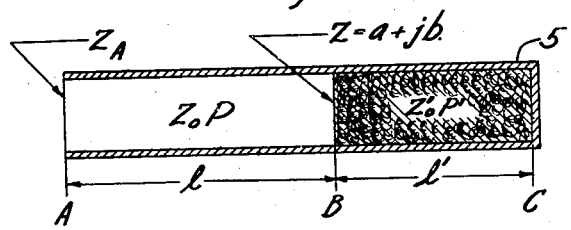
Figure 2:
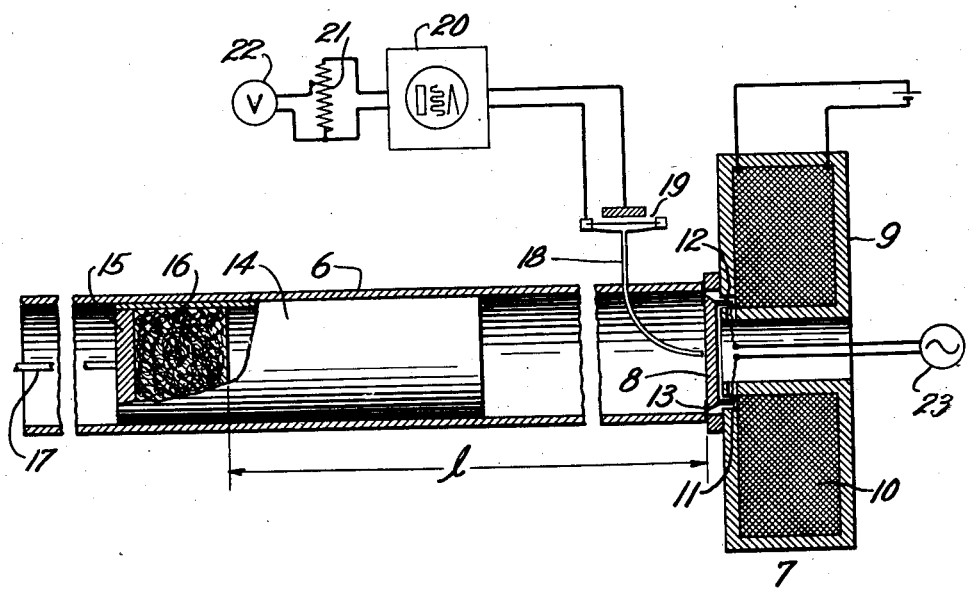

The invention may be more readily understood by reference to the following detailed description in connection with the drawing in which, Fig. 1 shows a simple diagram for illustrating the theory of the method of this invention, and Fig. 2 shows one embodiment of an apparatus according to this invention.

Referring to Fig. 1 there is shown a tube 5 closed at one end C and arranged to receive sound waves at the other end A. The portion of the tube B—C is filled with a material, the absorption coefficient of which it is desired to determine. It is assumed that the lateral walls of the tube are impervious to sound waves. The acoustic impedance for plane waves at the point A is given by the following expression, all impedances being expressed as force per unit area for unit velocity:

$$Z_a = Z_o \frac{Z \cosh Pl + Z_o \sinh Pl}{Z_o \cosh Pl + Z \sinh Pl} \quad (1)$$

Where, $Z_o$ and $P$ are, respectively, the characteristic impedance and propagation constant of the transmission medium A—B, $l$ is the length of the medium A—B and $Z$ is the acoustic impedance at B. This expression is obtained by reference to Equation 61, page 87 of The Propagation of Electrical Currents in Telephone and Telegraph Conductors, J. A. Fleming, Van Nostrand Company.

$Z$ may be expressed as a complex quantity, $$Z = a + jb \quad (2)$$

If the medium in the tube A—B is air it may be assumed that there is no dissipation and therefore:

$$P = o + j\beta = j\frac{\omega}{\gamma} \quad (3)$$

and $$Z_o = \rho\gamma = R \quad (4)$$

Where $\omega$ is the angular velocity equal to $2\pi f$, $\rho$ is the density, and $\gamma$ is the velocity of sound in air.

Substituting from Equations (2), (3) and (4) in Equation (1), $$Z_a = \frac{a + j(b + R \tan \beta l)}{R - (b \tan \beta l) + ja \tan \beta l} \quad (5)$$

The absolute value of this impedance is:

$$|Z_a| = R\sqrt{\frac{a^2 + b^2 + 2bR \tan \beta l + R^2 \tan^2 \beta l}{R^2 - 2bR \tan \beta l + (a^2 + b^2) \tan^2 \beta l}} \quad (6)$$

As $l$ is varied $|Z_a|$ passes through maximum and minimum values. Differentiating Equation (6) and equating to zero, to obtain these values we get, $$\tan \beta l = m \pm \sqrt{m^2+1} \quad (7)$$

where, $$m = \frac{R^2 - a^2 - b^2}{2bR} \quad (8)$$

One of the signs in Equation (7) corresponds to a maximum and the other to a minimum value of $|Z_a|$.

Substituting these values for $\tan \beta l$ in Equation (6), and simplifying, we get, $$\frac{|Z| \max.}{|Z| \min.} = \pm \frac{R - bm - b\sqrt{1+m^2}}{R - bm + b\sqrt{1+m^2}} = A \quad (9)$$

The negative sign may be shown to be inadmissible, therefore solving for $b$ we get, $$b = \frac{R}{m + \sqrt{1+m^2}\frac{1+A}{1-A}} \quad (10)$$

Letting, $S = \frac{1+A}{1-A}$, $$b = \frac{R}{m + S\sqrt{1+m^2}} \quad (11)$$

By analogy from Equation (54) Chapter XI of Transmission Circuits for Telephonic Communication, by K. S. Johnson, D. Van Nostrand Company, New York, it follows that, where $I_d$, $I_a$ and $I_r$ represent, respectively, the incident wave, the absorbed wave, and the reflected wave at B, $$\frac{I_a}{I_d} = \frac{2\sqrt{RZ}}{R+Z}$$

Therefore, since the incident power at B, $W_d$, is equal to the sum of the absorbed power, $W_a$, and the reflected power $W_r$, $$\frac{W_r}{W_d} = 1 - \frac{W_a}{W_d}$$

or $$\left(\frac{I_r}{I_d}\right)^2 = 1 - \left(\frac{I_a}{I_d}\right)^2$$

from which $$\left(\frac{I_r}{I_d}\right)^2 = 1 - \frac{(2\sqrt{R2})^2}{(R+2)}$$

$$\frac{I_r}{I_d} = \frac{R-2}{R+2} = \frac{R-(a+jb)}{R+(a+jb)} = C_1 e^\alpha \quad (12)$$

Where $C_1$ is defined as the amplitude coefficient of reflection. D, the coefficient of absorption of power, i. e., the ratio of the absorbed to the incident power, is equal to $1 - C_1^2$.

The absolute value of $C_1$ is, $$C_1 = \sqrt{\frac{(R-a)^2 + b^2}{(R+a)^2 + b^2}} \quad (13)$$

Letting, $$\frac{R^2 + a^2 + b^2}{2aR} = K^2 \quad (14)$$

we get, $$C_1 = \sqrt{\frac{K^2 - 1}{K^2 + 1}} \quad (15)$$

From Equations (8) and (14)

$$R = aK^2 + bm \quad (16)$$

or $$a = \frac{R - bm}{K^2} \quad (17)$$

Hence, substituting (17) in Equation (8) we get, $$2bRm = R^2 - \frac{(R-bm)^2}{K^4} - b^2 \quad (18)$$

or $$K^4 = \frac{(R-bm)^2}{R^2 - b^2 - 2bRm} \quad (19)$$

Substituting the value of $b$ from Equation (11) in Equation (19), $$K^4 = \frac{S^2}{S^2 - 1} \quad (20)$$

Or since $S = \frac{1+A}{1-A}$ from Equation (11), $$K^4 = \frac{(1+A)^2}{4A}$$

or $$K^2 = \frac{1+A}{2\sqrt{A}} \quad (21)$$

Substituting this value in Equation (15) we get, $$C_1 = \frac{\sqrt{A} - 1}{\sqrt{A} + 1} \quad (22)$$

This gives the absolute value of the coefficient of reflection in terms of the ratio of the maximum to the minimum values of the impedance at A.

If the waves are impressed on the tube at A by means of a diaphragm having a mass reactance which is large in comparison to its stiffness reactance, the velocity of the wave motion in the tube will be practically independent of the impedance into which the diaphragm works, and the input impedance will be practically proportional to the pressure at the face of the diaphragm. It is therefore possible to determine the reflection coefficient from the ratio of the maximum to minimum pressures at the diaphragm.

If the phase angle of the reflection coefficient is also desired the distance $l$ from A to B (i. e., in the apparatus of Fig. 2, the distance from the face of the diaphragm to the surface of the material under test) should be measured for either a maximum or minimum impedance. From that quantity and the ratio A both $a$ and $b$ may be calculated by the use of Equations (5), (7), (8) and (10).

The characteristic impedance and propagation constant of the material itself may be determined by a method analogous to that employed for electrical networks by measuring the ratio and product of the impedances at B when the tube is closed at C and terminated in a tube of one quarter wave length. These impedances correspond, respectively, to the open circuit and short circuit impedances of an electrical structure.

Referring to Fig. 2, there is shown one embodiment of an apparatus for carrying out the method of this invention: This apparatus comprises a tube 6 having walls practically impervious to sound and having a sufficient inner diameter to minimize internal friction. A tube of ¼" steel having an inside diameter of 3" was found suitable for this purpose. An electro-dynamic receiver 7 is arranged so that its diaphragm 8 completely closes one end of the tube. This receiver comprises a magnetic core 9 having an annular air-gap 11 and a magnetizing winding 10. A coil 12 attached to the outer rim of the diaphragm 8 is arranged to vibrate within this air-gap. The diaphragm 8 is composed of solid metal and is mounted on the inner surface of the tube by means of a ring 13 of chamois. This mounting gives a stiffness reactance which is negligible in comparison with the mass reactance of the diaphragm so that the velocity of the diaphragm is practically independent of the impedance into which it works. The diaphragm completely fills the tube and vibrates with a plunger action setting up plane waves. The tube 6 is closed at the other end by means of a snugly fitting piston 14. This piston has a solid back 15 and is made hollow so that the material 16, under consideration may be mounted within it. The piston is also provided with a rod 17 for moving it within the tube 6 so as to give the desired length of air column. A small tube 18 is sealed into the large tube so that its end is as near as possible to the face of the diaphragm 8. The outer end of this tube is sealed into a condenser transmitter 19 whose diaphragm vibrates in accordance with the pressure wave generated at the other end of the tube 18 and with an amplitude of vibration depending upon the position of the piston 14 in the tube 6. The electrical terminals of the transmitter 19 are connected to the input of a vacuum tube amplifier 20 having output terminals connected to a potentiometer 21 and a voltmeter 22. Electrical waves of varying frequencies are impressed on the moving coil 12 of receiver 7 from a variable frequency source 23.

The operation of the apparatus is as follows: The material 16 under test is mounted in the piston 14. A wave of frequency at which the characteristics of the material are desired is impressed upon the receiver 7 to impress sound waves upon the air in the tube 6. The piston is then moved to give maximum and minimum readings on the potentiometer 21 and voltmeter 22. The ratio of these maximum and minimum readings is determined and the amplitude coefficient of reflection, $C_1$, is calculated therefrom by means of the Formula (22). The test may be repeated for waves of other frequencies to determine the characteristics of the material over a range of frequencies.

What is claimed is:

1. The method of determining the acoustic properties of materials which comprises measuring the pressure at the input end of an acoustic line having its end terminated by means of the material under investigation then varying the length of the same line and again measuring the pressure at the same point.

2. The method of measuring the acoustic properties of materials which comprises measuring the maximum and minimum input impedance of a variable length acoustic line having its output end terminated by means of the material under investigation.

3. The method of measuring the acoustic properties of materials by means of a variable length acoustic line, which comprises terminating the output end of the line with the material under investigation, impressing a sound wave on the input end of the line, varying the length of the line, and measuring the ratio of the maximum to minimum impedance at the input end as the length is varied.

4. The method of determining the amplitude coefficient of reflection, $C_1$, of acoustic material by means of a uniform acoustic line, which comprises closing the output end of the line by the material under consideration, impressing a sound wave on the input end, varying the length of the line, and measuring the input impedance for various lengths to obtain the ratio, $A$, of the maximum input impedance to the minimum input impedance from which ratio the amplitude coefficient of reflection may be calculated by the formula, $$C_1 = \frac{\sqrt{A}-1}{\sqrt{A}+1}.$$

5. Apparatus for measuring the acoustic properties of porous material comprising a tube, means at one end of the tube for impressing sound waves on the atmosphere within the tube, means for closing the other end of the tube with the material under consideration, and means for measuring the impedance of the tube at said first mentioned end.

6. Apparatus for measuring the acoustic properties of porous materials comprising a tube, means at one end of the tube for impressing sound waves on the atmosphere within said tube, variable means for placing the material under consideration at a chosen distance from said first mentioned means so as to close the tube at that point, and means for measuring the ratio of the impedances of the tube at said first mentioned end for various positions of the material.

7. Apparatus according to claim 6, in which the wave impressing means has a velocity substantially independent of the impedance into which it works and the impedance ratio measuring means comprises a device for measuring the pressure of the atmosphere within the tube at the first mentioned end.

8. Apparatus for measuring the acoustic properties of porous materials comprising a tube containing a sound conducting medium, a plunger of large mass, means of negligible stiffness for mounting said plunger in one end of the tube, means for impressing vibratory motion on said plunger, a hollow piston for closing said tube, said piston being arranged to hold the material under investigation, and means for measuring the ratio of the impedances of the tube at the face of said plunger for various positions of the piston.

9. Apparatus for measuring the properties of acoustic materials comprising a tube containing a sound conducting medium, a plunger of large mass, means of negligible stiffness for mounting said plunger in one end of the tube to substantially close it, means for impressing vibratory motion on said plunger, a hollow piston for closing said tube at a point remote from said end, said piston being arranged to hold the material under consideration, a small tube having one end extending within said first mentioned tube to a point close to said plunger, and means associated with the other end of said small tube to indicate the pressure at the face of said plunger.

10. Apparatus according to claim 9 in which the means for indicating the pressure comprises means for converting the sound waves into electrical waves, and means for indicating the amplitude of said electrical waves.

11. Apparatus according to claim 9 in which the means for indicating the pressure at the face of the plunger comprises a condenser transmitter for converting the sound waves into electrical waves.

In witness whereof, I hereunto subscribe my name this 12th day of July, A. D. 1926.

EDWARD C. WENTE.